March 3, 1959 C. BEVOORT ET AL 2,876,281

COMMUNICATION SYSTEM CHANNEL TERMINATING APPARATUS

Filed Oct. 10, 1950 3 Sheets-Sheet 1

INVENTORS.
CORNELIS BEVOORT
RAIMOND EDOUARD MARIE BAUDET
BY
Brown, Jackson, Boettcher & Dienner
Att'ys.

March 3, 1959 C. BEVOORT ET AL 2,876,281

COMMUNICATION SYSTEM CHANNEL TERMINATING APPARATUS

Filed Oct. 10, 1950 3 Sheets-Sheet 2

INVENTORS.
CORNELIS BEVOORT
RAIMOND EDOUARD MARIE BAUDET
BY
Brown, Jackson, Boettcher & Dienner
Attys.

March 3, 1959 C. BEVOORT ET AL 2,876,281
COMMUNICATION SYSTEM CHANNEL TERMINATING APPARATUS
Filed Oct. 10, 1950 3 Sheets-Sheet 3
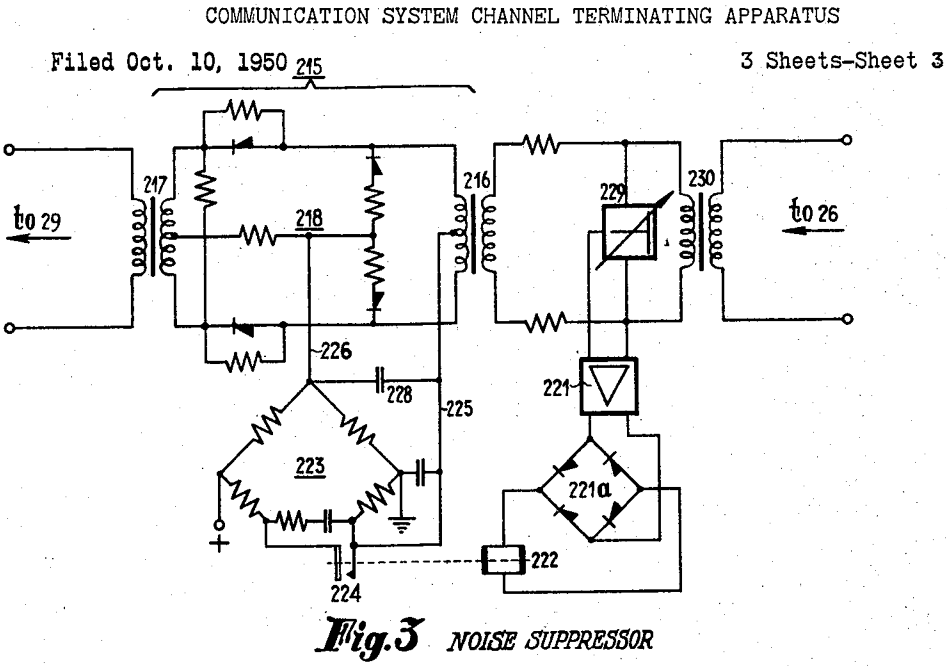
Fig. 3 NOISE SUPPRESSOR
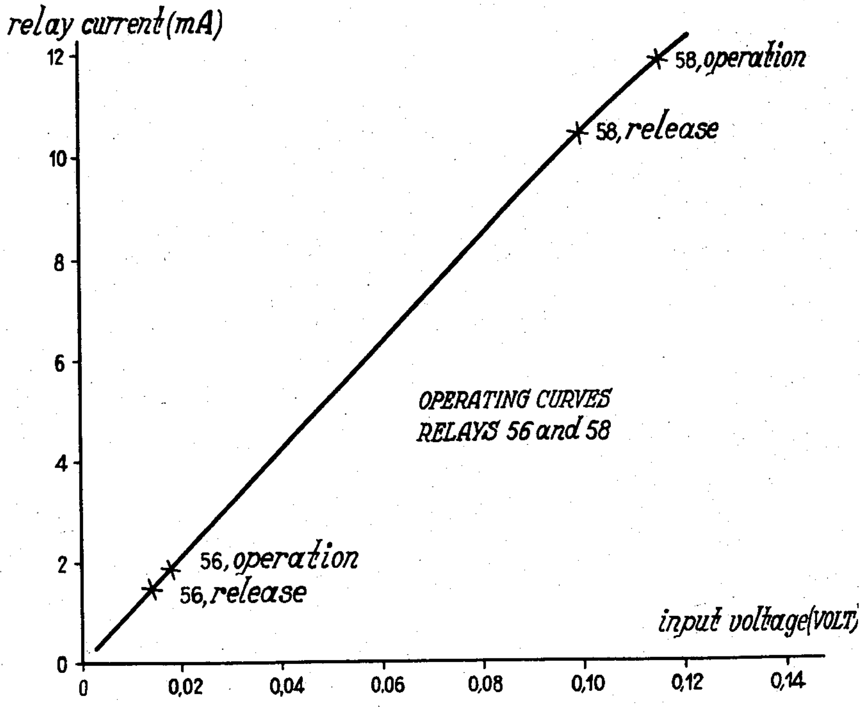
Fig. 4
INVENTORS.
CORNELIS BEVOORT
RAIMOND EDOUARD MARIE BAUDET
BY
Brown, Jackson, Boettcher & Dienner
Att'ys.

2,876,281

COMMUNICATION SYSTEM CHANNEL TERMINATING APPARATUS

Cornelis Bevoort and Raimond Edouard Marie Baudet, The Hague, Netherlands, assignors to Staatsbedrijf der Posterijen Telegrafie en Telefonie, The Hague, Netherlands Application October 10, 1950, Serial No. 189,411

Claims priority, application Netherlands October 11, 1949

8 Claims. (Cl. 179—1.5)

This invention relates in general to channel terminating apparatus for use in communication systems, and in particular to a channel terminating circuit for coupling a two-wire telephone line to an incoming and outgoing channel which constitutes one end of a given radio link.

Most channel terminating apparatus which have been used with telephone systems known heretofore have essentially consisted of a balance transformer and an artificial line which, in combination, were adapted to couple the incoming and outgoing channels respectively to the two-wire telephone line. In such arrangements it was not uncommon to have the speech currents, as applied to the incoming channel for conduction to the local two-wire line, leak back over the outgoing channel and the radio link. The leakage currents thus experienced interfere with the communication of the parties and is both disturbing and irritating to the subscribers.

In known types of channel terminating apparatus which also include amplifier arrangements in the incoming and outgoing channels for compensating for the loss in signal strength of the speech currents occurring in different sections of the signalling circuit, the leakage currents in the balance transformers will frequently provide an unbalance which results in low frequency oscillation, known in the art as singing, and serious communication interference may be experienced by the parties connected over such link.

Another fault inherent in most known types of coupling circuits is the variable nature of the output signals extending to the link and to the two-wire telephone position, the range of the signal being so great as to render it extremely difficult to conduct a conversation which is satisfactory to the parties.

There is a need for an improved channel terminating apparatus which is capable of overcoming these shortcomings of the known types of apparatus and it is the object of this invention to provide such type arrangement. It is a specific object of the invention to provide a channel terminating apparatus which is adapted for coupling of a radio link and a two-wire telephone position so as to eliminate the echo and propagation phenomenon now experienced in most known types of equipment.

A feature of the invention is the manner in which the channel terminating apparatus is operative to alternatively enable only the incoming or outgoing channel of the link, whereby the introduction of the echo and propagation phenomenon by the enabled channel into the other of the channels is substantially prevented.

Another feature of this invention is the manner in which the channel enabling means are operative in a matter of a few milliseconds which is comparatively rapid in comparison with the propagation time of the radio waves, and accordingly the introduction of singing into the channel is practically prevented.

A further feature of the invention is the manner in which the enablement of the alternative channels is automatically controlled by the speech current of the parties connected to the established link.

Another feature of the invention is the manner in which operating preference is provided for either one of the two channels, such operating preference being given in the disclosed embodiment to the incoming one of the channels. That is, the incoming channel is only suppressed when speech occurs in the outgoing channel, and is otherwise free to conduct received speech currents to the equipment associated with the two-wire position. The outgoing channel in such arrangement is normally non-conductive and the incoming channel is normally conductive. Modification of the equipment to provide preference for the outgoing channel may be also obtained as will be hereinafter suggested.

A further feature of the invention is the manner in which a differential commutator unit is provided to suppress the conductivity of either the incoming or outgoing channel responsive to the presence of speech current received in either of the channels as provided by the parties served by the link.

Another feature of the invention is the manner in which the channel terminating apparatus of the disclosure is operative to collaborate in a satisfactory manner either with a similar termination at the other end of the four-wire link, with a so-called absolute termination, or one in which outgoing speech is provided with preference.

A further feature of the invention is the manner in which the line terminating apparatus is provided with an automatic control means for maintaining full modulation in the outgoing channel and in which over-modulation is prevented by a limiter which levels the speech current to a given maximum value in the event that such is not reduced in a given time by the automatic volume control means.

A further feature of the channel terminating apparatus is the manner in which a noise suppressor is provided in the incoming channel to prevent operation of the equipment by noise disturbances, the equipment being operative to pass received amplitudes which are only above a certain level.

The equipment of the present invention is particularly adapted for use with the new and novel automatic volume regulator apparatus taught more specifically in the co-pending application filed May 26, 1951, having Serial No. 228,394, and the automatic volume control device set forth in the application having Serial No. 189,412, filed October 10, 1950.

Other features and advantages of the new and novel line terminating apparatus of the invention will be observed with reference to the accompanying specification and drawings in which:

Figure 3 illustrates in detail the noise limiter device connected in the incoming channel; and Figure 4 is a graphic representation of the value of current required for controlling the maximum-minimum relays of the automatic volume regulating equipment shown in Figure 1.

Figure 1:
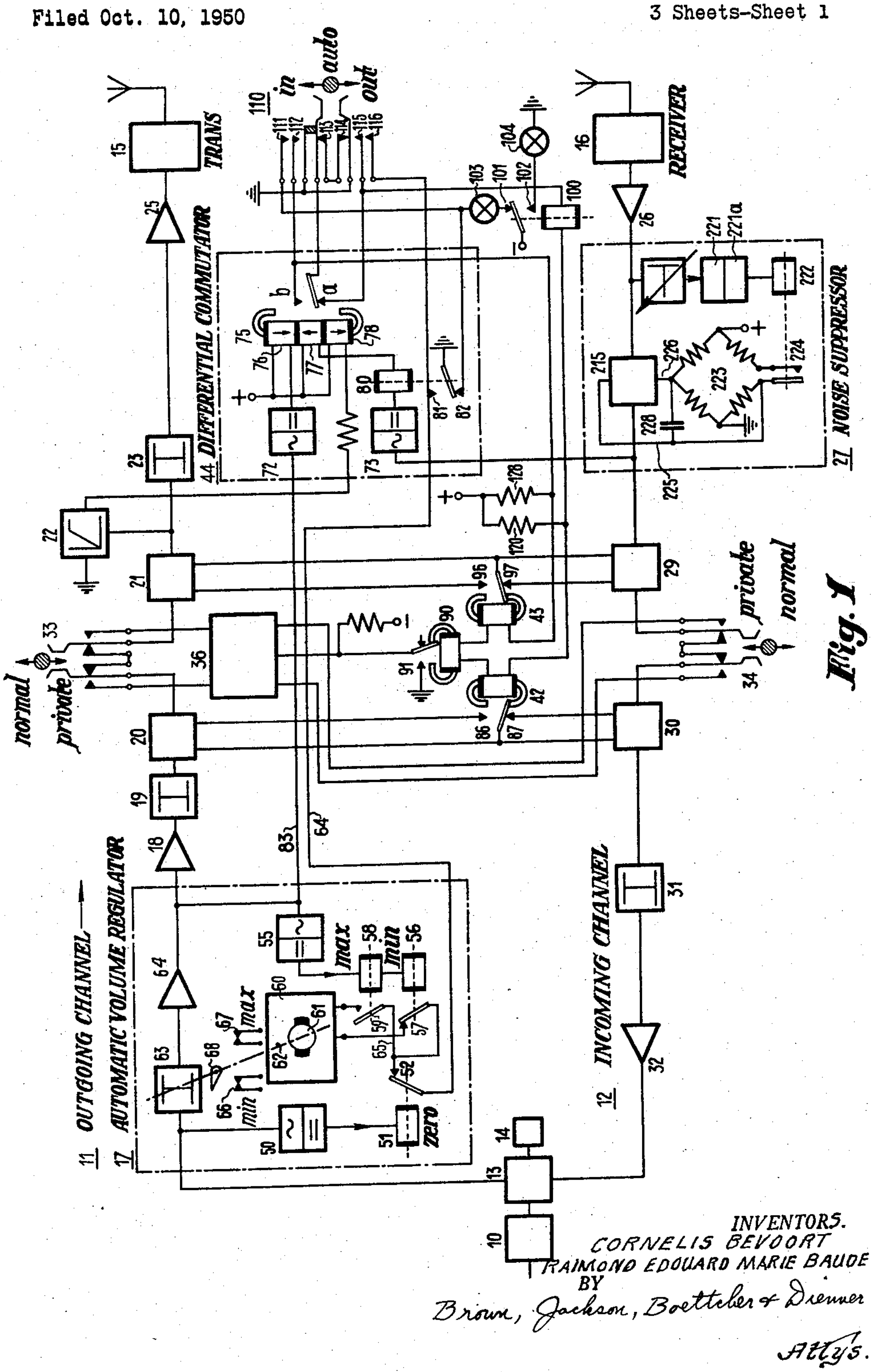
Figure 1 illustrates in schematic block form the line terminating circuit and accessories.

With reference now to Figure 1, the channel terminating apparatus there shown comprises an operator's position 10 which is connected to an outgoing channel 11 and an incoming channel 12 by means of a balance transformer 13 and an artificial balancing line 14. The outgoing channel terminates at one transmitter 15 of a given radio link, speech currents provided by the operator at 10 being conducted over the outgoing channel 11 to the transmitter 15 for transmission thereby to an associated receiver (not shown) at the other end of the radio link. The incoming channel 12 includes a radio receiver 16 which is associated with a transmitter (not shown) at the other end of the link which is similar to the illustrated transmitter 15 and which is operative to pick up the incoming radio frequency signals and transmit corresponding speech currents over channel 12 to the operator's position 10.

The outgoing channel includes an automatic volume regulating equipment 17, an amplifier 18, an attenuation pad 19, a first channel enabling switch 20, a second channel enabling switch 21, a peak-limiter unit 22, an attenuation pad 23, and an amplifier 25, the output thereof being connected to the modulator stage of the transmitter 15.

The incoming channel extending between the radio receiver 16 and the operator equipment 10 comprises an amplifier unit 26, a noise limiter unit 27, a first and second channel enabling switch 29 and 30, an attenuation pad 31 and an amplifier 32. The channels may further include key members 33 and 34 for inserting secret speaking device 36 in the equipment as desired, these units comprising alternatively a three kilocycle frequency inversion installation or a split band installation. Monitoring equipment may be connected between the channels for monitoring purposes in the conventional manner.

A differential commutator 44 arranged to be controlled by speech currents occurring in the incoming and outgoing channels is interconnected across the channels 11 and 12 and is operative at its output side to control switching equipment, indicated generally at 42 and 43, to alternatively enable one of the two channels 11 and 12 to conduct speech thereover as will be more fully described hereinafter.

Switches 20, 21, 29 and 30 controlled by switch relays 42 and 43 operate in such a manner that they carry current from one extremity to the other when the centers of the coil diagonals are connected and do not carry current when this connection is broken.

Switch control unit 90, which controls the secrecy installation device 36 is operatively controlled in series with switches 42, 43 by the differential commutator. Associated switches 33, 34 provide suitable means for enabling and disabling the secrecy installation equipment 36.

In operation the channel terminating apparatus effects enablement of the alternative channels, as required, to provide the desired communication link, maintains the signal level as supplied to the transmitter within a given range; suppresses random noises which may be present in the link prior to amplification in the channel apparatus, and effects the establishment of a communication link in which singing and other echo phenomenon are eliminated. The terminating apparatus is further operative to provide preference for one of the channels, the incoming channel in the present embodiment being rendered normally conductive and being only suppressed when speech occurs in the outgoing channel.

Briefly, as speech currents are produced by a party at the operator's equipment 10, the speech currents are applied to the outgoing channel 11 over the balance transformer 13 to the automatic volume control unit 17 which is operative to regulate the volume of the speech current passing in the channel to maintain same between predetermined limits. In the embodiment illustrated herein, the equipment is operative to adjust the variable attenuation network associated with the volume control to effect a decrease in the speech current level as soon as the input speech current surpasses the value of −15.5 db. The automatic volume control unit 17 is operative to decrease the attenuation in the channel and thereby effect an increase of the level of the speech current whenever the speech level descends below a given minimum value which in this embodiment is −34.5 db. Such limits having proven successful in an operative embodiment in which the main level on the two-wire path is −20 db and in which the level varies between a maximum of 0 and a minimum of −35 db, the termination attenuation being 5 db.

The speech currents at the output side of the volume control unit are extended over an amplifier 18, attenuation network 19, the switches 20 and 21 (assuming there is no speech in the incoming channel), a peak limiter unit 22, which is connected in the outgoing channel for the purpose of preventing over-modulation of the transmitter by such speech currents which are instantaneous spurts for which the automatic volume control unit cannot readily compensate, attenuation pad 23, and amplifier 25 to the modulating stage of the transmitter unit 15 for transmission over the radio link.

Signals incoming to the channel terminating apparatus as transmitted from the other end of the radio link are received by a radio receiver unit 16 and extended over a receiver amplifier unit 26, a noise suppressor unit 27 (which prevents response of the equipment to random noises) the enabled switches 29 and 30 (assuming priority preference for the speech currents on the incoming channel), attenuation pad 31, amplifier 32, and the balance transformer 13 to the operator's position 10.

The noise suppressor 27 is operatively controlled in accordance with the presence or absence of incoming speech currents to apply equal or different direct current voltages to an associated static relay 215 which is connected in series with the incoming line, the attenuation of the circuit being reduced about 20 db by such apparatus whenever speech is received. It is assumed in the use of equipment adjusted to these values that the incoming speech currents are at least 10 db stronger than the noise level. The noise suppressor 27 is also adjusted to be preferably sensitive to frequencies appearing in the speech band whereby the differential commutator 44 is substantially protected against false operation by transient line disturbances.

The differential commutator 44 is connected between the channels 11 and 12 and is sensitive to speech currents as they appear in either of these channels to control associated switching equipment such as 42, 43 to alternatively enable the incoming or outgoing channels.

The disablement of one channel and the enablement of another is accomplished in a matter of several milliseconds whereby the possibility of the presence of singing and echo phenomenon is substantially eliminated. The switches 42, 43 in the position shown in Figure 1 effect enablement of the incoming channel 12 and disablement of outgoing channel 11. The arrangement is adjusted so that with the impression of speech currents on the incoming path with speech on the outgoing channel, the transition time appears to be in the order of 3 milliseconds. With speech on the incoming channel and the impression of speech currents on the outgoing channel the transition time appears to be about 80 milliseconds.

The channel terminal apparatus described is operative to couple a given radio link with a two-wire telephone position in a manner which substantially eliminates singing and other undesirable echo phenomenon; provides an automatic arrangement for regulating the volume of the local subscriber speech currents to a given level; prevents noise and other undesirable disturbances on the incoming path from interfering with outgoing speech; effects rapid opening and closing of the transmitter and receiving path, interchangeably giving preference to one or other of the paths as desired without, however, operating between two syllables; and provides a termination system which is comparatively simple in structure and extremely reliable in use.

OUTGOING CHANNEL

The strength of the speech currents as applied by a partly at the operator's equipment 10 over the interconnecting two-wire members to the hybrid balance transformer 13, normally varies over a fairly large range of values, the signals being frequently outside the preferred operating range of the modulating stage of a conventional transmitter such as is illustrated at 15. The channel terminating apparatus of the invention includes an automatic volume control unit 17 which is automatically operative to effect proper compensation for such level variations as fed to the channel 11 whereby the signals applied to the modulating stage of the transmitter 15 are of a strength for which optimum operating results are obtained.

The automatic volume regulator 17, disclosed herein has been more fully described in the copending application which was filed by Bevoort and Baudet on October 10, 1950, and was assigned Serial No. 189,412, and accordingly will be only briefly considered at this point.

The equipment basically comprises a first level meter 50 which is arranged to control a zero relay 51, and a second level meter 55 which is arranged to control a series relay arrangement including a minimum relay 56 and a maximum relay 58. The relays 51, 56 and 58 control associated contacts 52, 57 and 59 respectively which are arranged to control extension of an energizing circuit to a motor panel 60 which controls operation of a regulating motor 61. The motor unit 61 through associated shaft means 62 adjusts a variable attenuation network 63 to various positions to vary the value of attenuation inserted in the channel 11 whereby the speech level output as modified by the regulator 17 is always within given predetermined limits. The level meter 50 determines the input level of the speech currents and the level meter 55 determines the output level of the speech currents, and together the level meters 50 and 55 control the motor 61 in its adjustment of the attenuation network 63 so that the desired output is always obtained. The speech output of the network 63 is amplified approximately 20 db by an amplifier unit 46 prior to its measurement by the level meter 55.

The first level meter 50 is peak sensitive and basically comprises a vacuum control tube element (not shown) which is normally biased to conduct, and a relay member 51 which is connected in the plate circuit thereof and is therefore normally energized. With the rise of the speech currents applied at the operator's position 10 to a value above a predetermined zero level the control tube is biased to cutoff and relay 51 which is connected in the plate circuit is restored and contact 52 controlled by relay 51 is moved to the position shown in Fig. 1 to effect the application of the operating potential on conductor 64 to conductor 65 and the contacts 57 and 59 of the maximum and minimum relays 58 and 56.

Level meter 55 is sensitive to mean level speech current and is connected to respond to the output speech currents of the regulator 17. The level meter 55 is basically similar to level meter 50, it being arranged to control the maximum and minimum relays 58 and 56 respectively.

Figure 4 sets forth the operating characteristics of the relays 56 and 58 respectively as included in one preferred embodiment of the equipment.

It is apparent therefrom that as the speech current output of the regulator 17 approaches the maximum limit, maximum relay 58 operates and at its contacts 59 connects the operating potential on conductor 65 to the motor panel 60 to effect the operation of the motor 61 and the adjustment of shaft means 62 to drive the adjusting arm of the variable attenuation pad 63 so as to increase the attenuation of the pad and thereby decrease the speech level output of the automatic volume regulator 17.

Similarly, when the speech level input to the level meter 55 decreases under the minimum value, the minimum relay 56 restores and at its contacts 57 applies operating potential to the second lead of the motor panel 60 (as shown in Figure 1) which effects operation of the motor 61 in the opposite direction to thereby decrease the value of the attenuation inserted by the variable attenuation pad 63 and thus increase the level of the speech current on the output side of the automatic volume regulator 17.

In the event the input level of the peak sensitive level meter 50 falls beneath the predetermined zero value, the control tube member associated therewith (not shown) is rendered conductive to complete an energizing circuit for the zero relay 51 which operates and at its contacts 52 interrupts the energizing circuit for the motor panel 60 and motor 61 to prevent further operation of the motor in its attempted adjustment of the attenuation network.

Minimum and maximum position limit stop contacts 66 and 67 respectively are mounted adjacent the shaft 62 and a cam member 68 mounted on the shaft 62 cooperates therewith to establish given limits of adjustment for the shaft member, the contacts being mounted to terminate motor operations as the shaft reaches the two extreme positions which correspond to the minimum and maximum attenuation which can be provided by the variable attenuation network 63. Suitable signal means may be connected with the contacts for informing the attendant of the operation of the equipment to such positions.

It is apparent from the foregoing description that the disadvantages inherent in known electronic controllers in which level variations are compensated for by charging or discharging given capacitors are eliminated in the disclosed arrangement. Further, the equipment is such that line disturbances, line noise and general noises will not effect the false operation of the volume control nor will termination leakage or other sounds from the receiver cause improper operation. Even large amplitude disturbances are rapidly limited in a reliable and dependable manner.

Equipment having the following specific values were used in a commercially successful arrangement. On a two-wire path over which the mean signal level is, of a value of —24 db and in which the level varies between a maximum of zero and a minimum of —35 db, and in which the termination attenuation is in the nature of 5 db, an attenuation network 63 having a range of 45 db is utilized with an amplifier 46 having a 20 db amplification at the mean level (—20 db on the two-wire path), with the use of apparatus having these values, the level at the level meter 55 will be —25 db to which level the motor will not respond, and the motor will be at rest.

The first level meter 50 is preferably sensitive only to frequencies between 300 and 3000 kc. with a peak at the central frequencies, whereby the operation of the automatic volume regulator equipment 17 responsive to transient noise disturbances is substantially minimized.

The volume regulator equipment 17 is further arranged so that the motor regulates the current level down more rapidly than up so that over-modulation may occur only for a very short moment. In this regard it is noted that the peak limiter 22 is included in the channel in order to prevent over-modulation of the transmitter should the speech level be instantaneously raised.

The output of the automatic volume regulator 17 is amplified by amplifier unit 18 and extended over switch members 20 and 21 if enabled by the differential commutator 44. Assuming for purposes of explanation that there is speech current in the outgoing channel 11, the switch members 20 and 21 will be in the channel enabling condition whereby the speech output of the automatic volume regulator equipment 17 as amplified by amplifier 18 and attenuauted by attenuation pad 19 is conducted over the switch members 20 and 21, the peak limiter 22, attenuation pad 23, and amplifier 25 to the transmitter 15 for transmittal over the radio communication link.

Figure 2:
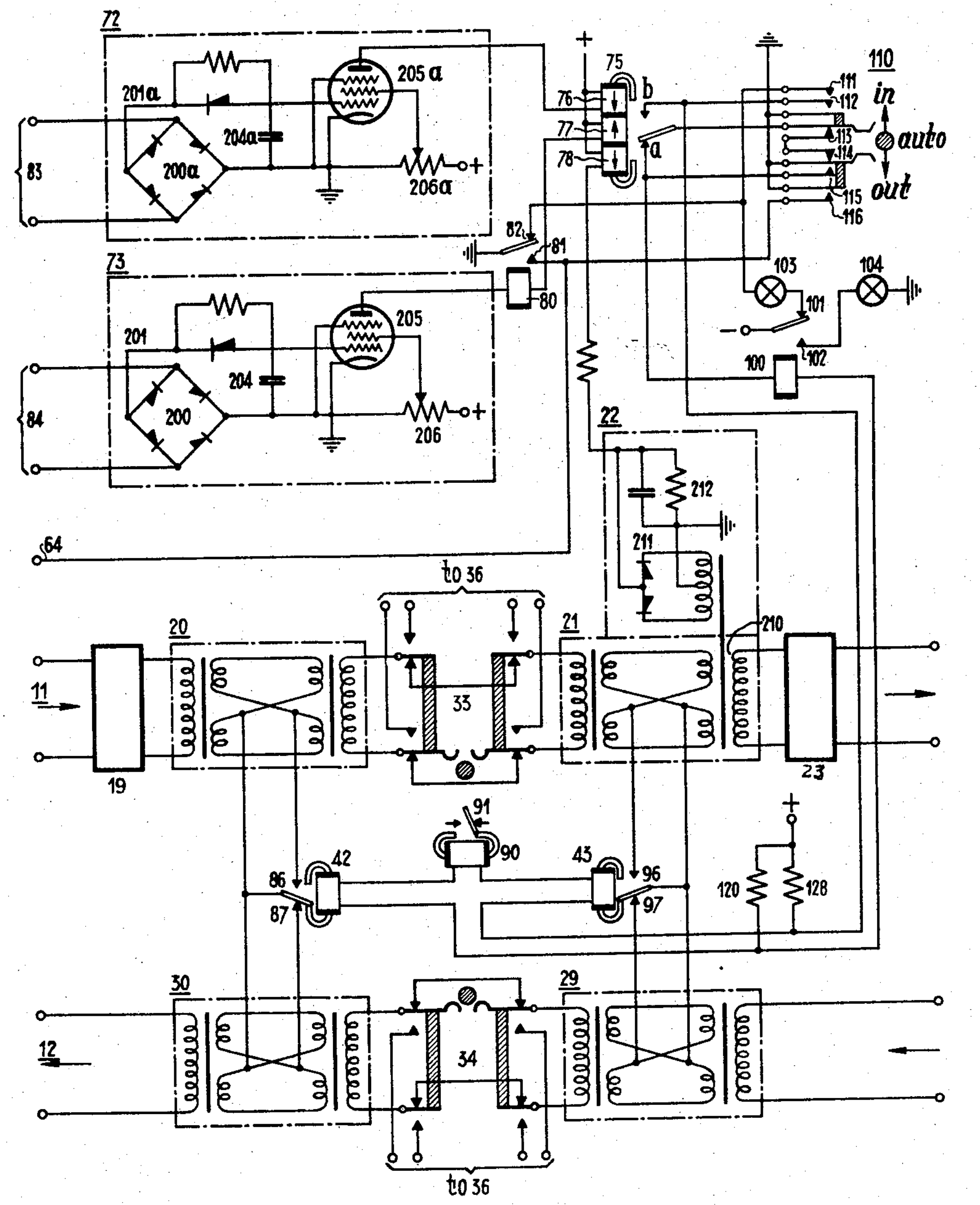
Figure 2 illustrates in detail the differential commutator for controlling the enabling switches for the incoming and outgoing channels.

The peak limiter unit 22, as shown in Figure 2, may comprise a transformer member 210 having a center tapped winding connected in the outgoing channel, which winding cooperates with a rectifier circuit 211 and a capacitor resistance network 212 to control the biasing current supply to the differential commutator 44 to prevent the passage of instantaneous noise values to the transmitter 15. Specifically, as speech currents occur in the outgoing channel and are picked up by the center tapped winding of the transformer 210, the currents are rectified by the circuit 211 and a rectified voltage developed across resistance 212 is fed over a series resistance to the biasing winding 78 of the differential relay 75. As the speech currents reach a predetermined value sufficient to energize winding 78, the associated armature is operated to close contacts *a*, which insert sufficient attenuation in the outgoing channel to attenuate the excessive current values. The threshold value of the limiter 22 may be varied by adjusting the value of resistance R212 and the value of the resistance connected in series therewith.

INCOMING CHANNEL

Incoming speech currents as received over the radio link are picked up by the receiver unit 16 and are extended to the local incoming channel 12 over an amplifier 26 and a noise suppressor 27.

The noise suppressor unit 27 is operative to prevent opening of the receiver paths responsive to transient noise disturbances which may appear in the radio link, one embodiment of the noise suppressor means 27 being shown in detail in Figure 3. The device is basically operative to lower the attenuation in the incoming channel whenever speech currents are received over the radio link by receiver 16, it being assumed that the speech is at least 10 db stronger than the noise level in the link. In order to attain this attenuation variation, several different circuits may be used such as shorting the line by resistances, switching coils, static relays, incandescent lamps with variant resistance, etc., and if necessary a resistance capacitor may provide a certain time delay.

In the arrangement shown in Figure 3, a static relay 215 comprising transformers 216 and 217 (which may have a ratio of 1:1) and a rectifier bridge 218 are connected in the incoming channel. A rectifier amplifier 221*a* (which is identical to the rectifier amplifier arrangements of the differential commutator 44) is connected to the channel 12 over amplifier 221, a variable attenuator path 229 and the secondary of transformer 230 immediately after the receiver amplifier 26. An associated relay 222 connected to the output side of the rectifier amplifier 221*a* is normally restored whereby the contacts 224 therein are normally open. As a result of the open condition of contacts 224, ground potential is connected to conductor 225 and positive potential is connected to conductor 226, whereby a direct current voltage is applied by the potentiometer circuit 223 over the conductors 225 and 226 to the static relay 215. The right hand rectifiers will accordingly conduct, and the left hand rectifiers are non-conductive. The right hand rectifiers in a conductive state short the secondary of the transformer 216 and introduce an attenuation of approximately 20 db into the incoming channel 12. The left hand rectifiers do not conduct and accordingly heavy attenuation is provided for the currents which pass through the parallel resistors, and noises and other disturbing effects are suppressed thereby during the periods that speech frequencies are not received thereover. With the receipt of speech currents by the receiver unit 16, the incoming speech currents are fed over attenuation path 229 to amplifier 221, which extends them as amplified to rectifier circuit 221*a* which rectifies same and applies the rectified amount to the winding of relay 222 to cause same to operate. Relay 222 operates, and at its contacts 224 connects a potential to the conductor 225 which is more positive than the potential applied to conductor 226. As a result, the conducting state of the rectifier pairs alternates; that is, the left hand rectifiers conduct and the right hand rectifiers now block, whereby the attenuation of the circuit is reduced by at least 20 db. An RC filter is connected across contacts 224 to eliminate the introduction of undesirable clicking noises into the circuit. The capacitor members, such as 228, introduce a certain delay in operation and further thwart the introduction of clicking sounds into the channel.

A filter is preferably used with the rectifier amplifier arrangement 221 and 221*a* which renders the unit sensitive to frequencies in the speech band, whereby response of the equipment to false noise disturbances is further minimized. The static relay 215 as shown in this embodiment has a constant impedance rating.

Any desired signal-noise ratio may be provided by selection of the corresponding values of the resistance members. A given operating peak in the speech band may be provided for control relay 222 by selection of the proper values for the rectifier members in the input rectifier bridge 221*a*. By initially adjusting the suppressor for use in a radio link having the most adverse conditions known to exist in the field, further adjustment will not be necessary.

The noise suppressor unit in the incoming channel provides protection against false operation by the differential commutator 44 responsive to transient noise disturbances which occur on the radio link path. Furthermore the arrangement is such that suitable differentiation is made between the transient noises and the speech levels, and the differential commutator 44 is therefore operable in a reliable and rapid manner responsive to the presence of speech currents on the incoming channel. The noise suppressor further improves the quality of the speech currents which are applied to the radio link, the background noise being considerably reduced in the use of this type equipment.

Finally failing the use of such a noise suppressor, remarks of short duration as received from the distant party would interrupt the outgoing speech.

The incoming speech currents as extended over the noise suppressor 27 are conducted to the differential commutator 44 and over the switches 29 and 30 (assuming no speech in the outgoing channel 11), attenuation pad 31, amplifier 32 and the hybrid coil 13 to the operator position 10. As will be shown hereinafter with the presence of speech currents in the incoming channel 12, the differential commutator 44 removes operating potential from conductor 64 and the automatic volume regulator 17 is rendered inoperative whereby false operation thereof by leakage current is prevented.

CHANNEL CONTROL

The differential commutator 44 is connected between the incoming and outgoing channels 11 and 12 by conductors 83 and 84 and responds to the speech currents appearing on these channels to control switch members 20, 21 and 29, 30 to enable and disable the channels in accordance with the nature of the currents present thereon. With reference to Figure 1 it is noted that the differential commutator 44 basically comprises a first level meter 72 and a second level meter 73 which are respectively connected to the outgoing and incoming channels 11 and 12. A differential relay 75 having three windings 76, 77 and 78 is connected to the output sides of the level meters 72 and 73, the first winding 76 being connected in the output side of the first level meter 72 and the second winding 77 being connected in the output circuit of the level meter 73. Supervisory relay 80 is also connected in the output circuit thereof. A third winding 78 of the differential relay 75 is a biasing winding which is connected to the peak limiter unit 22 as heretofore described. Thus, since the input side of the first level meter 72 is connected over conductor 83 to the outgoing channel, the first winding 76 of the differential control relay 75 is operatively controlled by the presence or absence of speech currents in the outgoing channel 11. Since the input side of the second level meter 73 is connected over conductor 84 to the incoming channel 12, the supervisory relay 80 and the second winding 77 of the differential relay 75 are controlled in their operation by the presence or absence of speech currents in the incoming channel 12.

The third winding 78 of the differential relay is operatively energized by the speech currents in the outgoing channel as evaluated by the peak limiter 22.

The supervisory relay 80 at its contacts 81 and 82 controls the application and removal of operating potential to and from conductor 64 extending to the automatic volume regulator equipment 17 whereby with the presence of speech currents in the incoming channel 12, the operating potential for the automatic volume regulator equipment 17 is automatically interrupted to prevent the response thereto to possible leakage currents which may appear in the outgoing channel 11.

The differential relay 75 at its contacts *a* and *b* is operative to control switching relays 42 and 43 in the alternative enablement of the incoming channel 12 or outgoing channel 11, the control relay 90 in the control of the secrecy installation 36 and the supervisory relay 100 which provides visual signals as to the existing condition of the apparatus.

The supervisory relay 100 at its contacts 101 and 102 effects the alternative illumination and extinguishment of a pair of supervisory lamps 103 and 104, the supervisory relay being operative with the presence of speech currents in the incoming channel 12 to close contacts 101 and effect illumination of lamp 103. With the presence of speech current in the outgoing channel 11, the supervisory relay 100 is restored and contacts 101 complete an operating circuit for the lamp 104.

The switching relay 90 is effective at its contacts 91 to selectively control the enablement and disenablement of the split band secrecy installation 36 when connected in the manner illustrated in the drawings. The switching relay 90 accomplishes no other purpose than to control the secrecy installation, and in arrangements in which such equipment is not included, the relay 90 will not be required. In instances where it is utilized, a single secrecy installation is sufficient due to the use of double switches, such as 20 and 21. Split band installations may also be used. In that the switch coil impedance in the open condition is very high, and in the transmitting condition is ±600 ohms, the secrecy installation will always be terminated on 600 ohms at both ends. Inasmuch as the secrecy installation per se is not a specific feature of the invention, a detailed description thereof is not set forth herein.

The enablement and disenablement of the incoming and outgoing channels is accomplished with the operation of the switching relays 42 and 43 by the differential commutator 44, the switching relays 42 and 43 being operative with their contacts 87, 97 closed, as illustrated in Figure 1, to enable the switches 29 and 30 in the incoming channel 12 whereby transmission can be effected thereover, and contacts 86 and 96 are simultaneously opened to disable the switches 20 and 21 in the outgoing channel 11, whereby transmission of speech current thereover is prevented.

The differential relay 75 which controls the switching relays 42, 43 at its contacts *a* and *b* has three control windings 76, 77 and 78 which are operative to control its associated armature in the opening and closing of these contacts. The level meter 72 normally (no speech in outgoing channel) supplies a given operating current to the first winding 76 of relay 75 which urges the armature to close contacts *a*. The level meter 73 however normally (no speech in incoming channel) supplies a current of equal and opposite value to the second winding 77 which urges the armature to close contact *b*. The third winding 78 is a biasing winding to which a bias current is normally applied which urges the armature to close contacts *a*, the value of the force provided by winding 78 being one half the value of the force exerted by windings 76 or 77 alone. Thus with normal conditions existing i. e. no speech current in either channel, the current in the first and second windings 76 and 77 will be opposite and equal which theoretically would cause the armature to assume a neutral or midway position between the contacts *a* and *b*. However the biasing winding 78 aids the first winding 76 and the armature will therefore normally be urged to close contacts *a*, whereby the supervisory relay 100, and the three switching relays 42, 43 and 90 are thus normally operated to give preference to the incoming channel 12. Lamp 103 will be illuminated to indicate to the attendant that the incoming channel is conductive. The operating circuit for the switching relays extends from ground over the contacts 114 and 113 of switch 110, contacts *a*, the windings of relay 100, 42, 90 and 43 and resistor 128 to positive battery.

With the receipt of incoming speech currents, the level meter 73 operates to cutoff the current flow in the second winding 77 of the differential relay 75, the resulting force exerted on the armature of the relay 75 thereupon being comprised of the force exerted by windings 76 and 78, both of which urge the armature to maintain contacts *a* closed, and accordingly the switching relays 100, 42, 90 and 43 are maintained energized and the incoming channel is maintained in its enabled state.

With the initiation of speech at the operator's position 10 and the appearance of speech in the outgoing channel 11, the level meter 72 effects cutoff of current in the first winding 76 of the differential relay 75, and the resulting forces exerted on the armature comprise the force exerted by winding 77 which urges the armature to close contacts *b*, and winding 78 which urges the armature to close contacts *a*. However since the winding 78 provides an effective force of a value which is only one half that provided by winding 77, the winding 77 will be successful and cause the armature to close contacts *b*. Switching relays 42, 43 are then operated to open contacts 87 and 97 thereby disabling the incoming channel 12, and to close contacts 86 and 96 and thereby enable the outgoing channel 11. Supervisory relay 100 restores and at its contacts 102 completes an operating circuit for supervisory lamp 104 whereby a visual indication of the enabled condition of the outgoing channel is effected.

The details of the structure of the differential commutator are set forth in detail in Figure 2. As there shown each of the level meters 72 and 73 are of a similar nature. The level meter 73, for example, which has its input side connected to the incoming channel 12 by means of conductors 84 comprises a rectifier bridge 200 to which the input conductors 84 are connected. The output side of the rectifier bridge is coupled to a control tube member 205 by means of resistance rectifier network 201 and capacitance member or members 204, these members causing the switching of the control tube to be more positive in its nature. Control tube 205 is biased to normally conduct, the biasing potential being applied to one of the grid members over a resistor unit 206. The tube 205 being normally conductive effects a current flow through transfer relay 80 and the second winding 77 of the differential relay 75 which are connected in the plate circuit of the tube 205. The effective force provided by winding 77 is approximately 20 ampere turns which urges the armature to close contacts *b*.

The second level meter 72 in the differential commutator 44 is connected by means of conductors 83 to the outgoing channel 11 and is comprised of elements similar to that of the level meter 73 just described. The level meter 72 however controls the supply of current to winding 76 of the differential relay 75, the winding 76 being connected in the plate circuit of the control tube 205*a* thereof. With normal conditions existing current flows through winding 76 which urges the armature with an effective force of approximately 20 ampere turns to close contacts *a*. Thus windings 76 and 77 which are controlled respectively by level meters 72 and 73 and are oppositely wound, urge the armature in opposite directions and it remains for the biasing winding 78 which provides a force of approximately 10 ampere turns to urge the armature to close contacts *a*. The windings of the differential relay are of a high impedance to aid in the accomplishment of rapid switching.

The energization of the differential relay 75 responsive to the existence of various given conditions and the manner in which the incoming and outgoing channels are alternatively enabled and disabled is best set forth by the following chart.

channel 12, it is apparent that the electron control tube 205*a* of the level meter 72 connected to the outgoing channel will be rendered non-conductive, and accordingly there will be no current flow through the first winding 76 of the differential relay 75. The field developed thereby decreases to zero, the field developed by the second winding 77 remaining at —20 ampere turns and the field developed by the biasing winding being a positive 10 ampere turns. The resulting field strength is now —10 ampere turns and the armature of the differential relay 75 is therefore operated to close contacts *b* to complete an operating circuit for the switching relays 42, 43. The switching relays 42, 43 in operating are effective at their contacts 87 and 97 to disable the incoming channel, and

*Fields developed in windings of differential relay 75 for various conditions*

| Condition of Channels 11 and 12 | Winding 76 (outgoing) | Winding 77 (incoming) | Winding 78 (blassing) | Resultant field | Incoming Channel | Outgoing Channel |
|---|---|---|---|---|---|---|
| resting condition—no speech at all | +20 AT | −20 AT | +10 AT | +10 AT | open | closed. |
| speech incoming on channel 12—no speech going out on channel 11. | +20 AT | 0 | +10 AT | +30 AT | open | closed. |
| speech coming in and going out—incoming speech breaking in. | 0 | 0 | +10 AT | +10 AT | open | closed. |
| speech going out—no speech coming in | 0 | −20 AT | +10 AT | −10 AT | closed | opened. |

The speed in which one channel is enabled and the other is disabled is determined by the transition time of the differential relay 75 which will now be given consideration.

With reference to Figure 2, the differential relay 75 is illustrated in its normal condition with contacts *a* in the closed condition. The relay 75 is preferably of the side stable polarized type in which the armature has no intermediate position.

The equipment shown in Figure 2 is in the energized rest condition; that is, energized, but with no speech current on either the incoming or outgoing channel. In such arrangement the electron tube members 205 and 205*a* of the level meters 72 and 73 respectively are both conducting and current flow is effected through the three windings of the differential relay 75 and relay 80.

The differential relay 75 when thus energized causes its armature to effect the closure of contacts *a*; that is, the windings 76 and 77, which are oppositely wound, each create a field of approximately 20 ampere turns and the biasing winding 78 provides a force of 10 ampere turns. The total resultant field developed by the relay is therefore a force of 10 ampere turns (76+20, 77—20, 78+10) which urges the armature of relay 75 to close contacts *a* and thus operate switch relays 42, 43 to effect enablement of the incoming channel.

Assuming now that speech current appears in the incoming channel, the incoming speech currents will cause the control grid of the electron tube 205 in level meter 73 to be negatively biased, whereby the tube is rendered nonconductive, and current flow in the second winding 77 is cut off, the field decreasing in value from —20 ampere turns to zero within 3 milliseconds. The total resultant field, as shown in the above table, will now constitute +20 ampere turns of winding 76 and +10 ampere turns of winding 78 which urge the armature to maintain contacts *a* closed, and accordingly the incoming channel will remain in the enabled state and the outgoing channel will remain disabled. For all practical purposes leakage will likely occur, and accordingly the field developed by winding 76 of the differential relay 75 may vary from zero to a possible maximum of 20 ampere turns. Even if the maximum field of 20 ampere turns is developed by leakage current the field developed by the biasing winding 78 and winding 76 is sufficient to overcome such leakage and maintain the equipment in the proper condition.

Assuming now that speech current appears in the outgoing channel 11, and no speech appears in the incoming at their contacts 86 and 96 to complete the enabling channel circuit for the outgoing channel.

In the event that incoming speech currents appear on the incoming channel at this time and the outgoing speech currents are cutoff for a moment, the electron tube 205 of the level meter 73 connected in the incoming channel will be rendered non-conductive, and the field provided by the second winding 77 of the differential relay 75 will decrease from a field of —20 ampere turns to zero within 3 milliseconds. The electron control tube 205*a* and the level meter 72, which is connected to the outgoing channel, are rendered conductive as the outgoing speech currents are terminated, and the current flow in the first winding 76 of the differential relay 75 will cause the field to increase from zero to plus 20 ampere turns in about 160 milliseconds. The armature on the differential relay 75 is accordingly moved to close contacts *a* to control operations of the switch relays 42, 43 and thus effect the blocking of the outgoing channel and to effect enablement of the incoming channel within three milliseconds.

Assume now that the equipment is operative with incoming currents being received on the incoming channel 12, and further that outgoing speech currents now appear upon the outgoing channel 11. The transition time in such event will be longer than the three milliseconds experienced under the previous conditions, such arrangement being desirable in that the outgoing channel must not be opened before the echoes and reflections on the two wire line have died away.

As described heretofore with the equipment responding to incoming speech currents, the field energization of the differential relay 75 will be between plus 10 and plus 30 ampere turns and contacts *a* will be closed. For purposes of example, it will be assumed hereat that the field is plus 20 ampere turns. Supposing now that the incoming speech currents are temporarily interrupted and that simultaneously outgoing speech currents are applied to the outgoing channel, the electron control tube 205 in level meter 73 which is connected to the incoming channel 12 will be rendered conductive, and current flow is effected through the second winding 77 of the differential relay 75 to develop a field strength of —20 ampere turns in approximately 160 milliseconds. Simultaneously, the electron tube 205*a* in the level meter 72, which is connected to the outgoing channel 11, will be rendered non-conductive and the current in the first winding 76 of the differential relay 75 will drop in about 2 milliseconds from plus 20 ampere turns to zero.

The resulting field developed in the relay windings thus changes from +20 ampere turns to —10 ampere turns, the armature associated with the relay 75 changing positions to open contacts *a* and close contacts *b* when the resulting field approximates —10 ampere turns; that is, the field of +10 ampere turns which is constantly affected by the biasing winding 78, is equalized by the more slowly increasing field in the second winding 77. This should occur after approximately 80 milliseconds have elapsed, thus providing a safety factor during which echoes and reflections will have died out.

In this manner the differential commutator affects efficient, reliable and expeditious control of the switch members in the alternative enablement of the incoming and outgoing channels.

There has been set forth heretofore a novel and improved type channel terminating circuit which provides an improved circuit for coupling two-wire telephone lines to the incoming and outgoing channels of a radio link. The equipment effectively provides an arrangement in which both incoming and outgoing speech may be conducted over a radio link at a desirable speech level and without the interference from low frequency oscillations and other echo phenomenon which are common to known types of radio link equipment. As a result the arrangement provides subscriber service in equipment including 2 wire—4 wire connections which has not been obtainable with other equipment known heretofore.

While we have illustrated and described what we regard to be the preferred embodiment of our invention, nevertheless, it will be understood that such is merely exemplary and that numerous modifications and rearrangements may be made therein without departing from the essence of the invention.

What is claimed is:

1. Channel terminating apparatus for coupling a given communication line to the incoming and outgoing channels of an associated link comprising in combination, means for coupling said communication line to said incoming and outgoing channels, switching means including a first and a second attenuation means connected in said first channel and a third and a fourth attenuation means connected in said second channel, a first relay member operative to control the effectiveness of said first and third attenuation means, and a second relay member operative to simultaneously control effectiveness of said second and fourth attenuation means to thereby place said equipment in either of two alternate conditions of operation, one of said conditions comprising the enablement of said incoming channel and the disablement of said outgoing channel, and the second of said conditions comprising the enablement of said outgoing channel and the disablement of said incoming channel, a secret speaking device arranged for connection to each channel at a point located between the attenuation means connected therein, a switch member for effecting connection of said secret speaking device to said channels, and a common control circuit for rendering said secret speaking device control switch and said first and second control relays effective simultaneously.

2. Channel terminating apparatus for coupling a given communication line to the incoming and outgoing channels of an associated link comprising in combination, means for coupling said communication line to said incoming and outgoing channels, automatic volume control unit means connected in said outgoing channel for maintaining the current level in said channel within a given range of values, attenuation means, differential commutator means connected to said incoming and said outgoing channels operative with the application of speech currents to one of said channels to control said attenuation means to enable the particular channel to which the speech current has been applied and to disable the channel having no speech current therein, and peak limiter means operative responsive to determination of instantaneous values which pass said automatic volume control means in the outgoing channel to control said differential commutator means to effect insertion of sufficient attenuation therein to attenuate the peak values.

3. An arrangement as set forth in claim 2 in which said peak limiter means comprises voltage derivation means including a rectifier unit and a capacitor-resistor network connected to said outgoing channel for supplying an instantaneous signal to said differential commutator means with the detection of a signal of greater value than a given predetermined limit.

4. An arrangement as set forth in claim 2 in which said link comprises a radio link one branch of which terminates in a transmitter connected in said outgoing channel, and in which said peak limiter means and said differential commutator means are connected in said outgoing channel between said automatic volume control means and said transmitter.

5. Differential commutator means for use in channel terminating apparatus adapted to couple a given communication line to a first and a second channel of an associated link which apparatus includes switching means operative in one condition to enable said first channel and disable said second channel, and operative in a second condition to enable said second channel and disable said first channel; said differential commutator means comprising a first signal producing means operative responsive to the presence and absence of speech currents in said first channel to provide corresponding signal representations of the existing condition therein, a second signal producing means of similar operating characteristics connected to said second channel, comparing means for matching the signal output of said first and second signal producing means in opposition comprising a differential relay having a first winding of a given number of turns connected in the output circuit of said first signal producing means and a second winding of a number of turns equal to that of said first winding and wound in opposition to said first winding connected in the output circuit of said second signal producing means, an armature on said relay operative between two positions to control the energizing circuits for said channel switching means in effecting transition of the equipment between said first and second conditions, a third winding having a number of turns which is less than that of said first and said second windings, and means for connecting said third winding to an energizing source in aid of said first winding to control said equipment to assume a preferred one of said two conditions with the absence of speech currents in each of said channels.

6. Differential commutator means for use in channel terminating apparatus adapted to couple a given communication line to a first and a second channel of an associated link, which apparatus includes channel switching means operative in one condition to enable said first channel and disable said second channel, and operative in a second condition to enable said second channel and disable said first channel; said differential commutator means comprising a first signal producing means operative responsive to the presence and the absence of speech current sin said first channel to provide a corresponding signal representative of the existing condition in said channel at any time, a second signal producing means of like operating characteristics connected to said second channel, comparing means for matching the signal output of said first and second signal producing means comprising a differential relay having a first winding connected in the output circuit of said first signal producing means and a second winding wound in opposition to said first winding and connected to the output circuit of said second signal producing means, an armature for said relay operative between two positions to control operation of said channel switching means in enabling and disabling said channels, a third winding and means connected to a potential source to energize said third winding in aid of one of said windings and thereby urge the armature into a preferred one of said positions with both channels quiet and to also create a variance in the transition times in changing from said first condition to said second condition and from said second condition to said first condition.

7. In a signal transmission system having a linking medium extending between terminals therein, termination means for at least one of said terminals comprising a first and a second channel, differential commutator means for controlling enablement and disablement of said channels comprising a relay having two differentially wound windings, means for supplying signals to the first winding which are indicative of the speech current conditions in the first channel, means for supplying like signals to the second winding to indicate the speech current conditions in the second channel, switching means operated by said relay to a first position enabling said second channel with energization of said first relay winding alone and operated to a second position with energization of said second winding alone to enable the first channel; a biasing winding for said relay, and means connected to said biasing winding for energizing same in aid of said first winding to cause said relay to operate said switching means to its first position responsive to concurrent energization of said first and second windings.

8. In channel terminating apparatus for coupling a commuication line to the incoming and outgoing channels of an associated link, noise suppressor means connected in said incoming channel comprising a rectifier bridge including four rectifier members, an input and an output circuit for connecting said bridge in said incoming channel, a first pair of resistor members connected with a first pair of said rectifiers to shunt said input circuit with the conductivity of said first rectifier pair; a second pair of resistor members connected to attenuate said incoming channel with the placement of a second pair of said rectifiers in the nonconducting condition, speech detection means connected to the incoming channel and voltage generating means operatively controlled by said speech responsive means in the absence of speech current in the channel to supply to said rectifier bridge an energizing voltage of a polarity which renders said first pair of rectifiers conductive and said second rectifier pair nonconductive, whereby a heavy attenuation is normally introduced into said incoming channel to prevent the entry of noise into the terminating apparatus, and operatively controlled by said speech detection means responsive to the occurrence of speech in said incoming channel to reverse the polarities coupled to said rectifier bridge, whereby said first pair of rectifiers is rendered non-conductive and said second rectifier pair is rendered conductive to provide a direct path for the speech currents over said incoming channel to the terminating apparatus.

References Cited in the file of this patent

UNITED STATES PATENTS

| | | |
|---|---|---|
| 1,825,304 | Burnside | Sept. 29, 1931 |
| 1,973,027 | Taylor | Sept. 11, 1934 |
| 1,986,514 | Mitchell | Jan. 1, 1935 |
| 1,986,516 | Mitchell | Jan. 1, 1935 |
| 2,061,555 | Bjornson | Nov. 24, 1936 |
| 2,109,557 | Taylor | Mar. 1, 1938 |
| 2,206,146 | Wright | July 2, 1940 |
| 2,209,667 | Taylor | July 30, 1940 |
| 2,212,960 | Schott | Aug. 27, 1940 |
| 2,224,569 | Dickieson | Dec. 10, 1940 |
| 2,228,866 | Bjornson | Jan. 14, 1941 |
| 2,273,945 | Fischer | Feb. 24, 1942 |
| 2,338,410 | Cousins | Jan. 4, 1944 |
| 2,352,081 | Davis | June 20, 1944 |
| 2,472,894 | Gillings | June 14, 1949 |